CARRIER-CURRENT INTERCOMMUNICATION SYSTEM
Filed Sept. 20, 1957
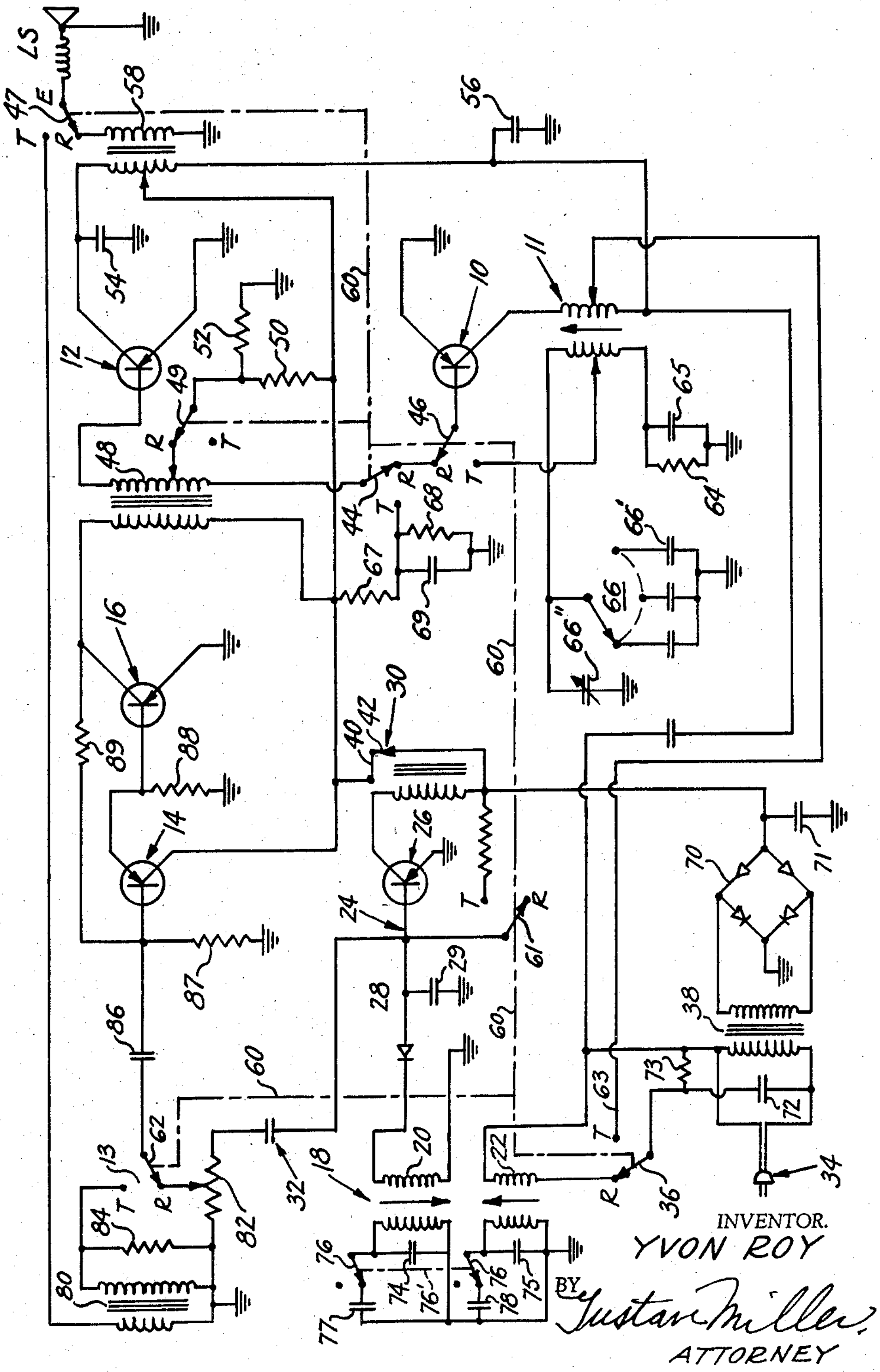
INVENTOR.
YVON ROY
BY Gustav Miller
ATTORNEY United States Patent Office 2,883,459

Patented Apr. 21, 1959

2,883,459

CARRIER-CURRENT INTERCOMMUNICATION SYSTEM

Yvon Roy, Moncton, New Brunswick, Canada

Application September 20, 1957, Serial No. 685,314

4 Claims. (Cl. 179—2.5)

The present invention relates to a carrier-current communication system.

An object of the present invention is to provide an intercommunication which lends itself to instant response to a signal without a period of "warm-up" as required by presently in use communication systems using vacuum tubes.

Another object of the present invention is to provide an intercommunication system which may be continuously operated at little or no current drain, and one which may be left in "standby" condition without damage or deterioration.

A further object of the present invention is to provide an intercommunication system which is suitable for multichannel use, one suitable for use in areas of loud background noise, one highly selective and sensitive in its receiving circuit allowing channels to slave stations to be separated by only a few kilocycles of frequency, one which is highly effective in action, as well as one which may be economically manufactured and assembled.

These and other objects and advantages of the present invention will be fully apparent from the following description when taken in conjunction with the annexed drawing, which shows a preferred embodiment of the invention, and in which the aforesaid objects of the invention are accomplished by a unitary circuit arrangement acting both as a transmitter and a receiver. It is used as a transmitter, by impressing a radio frequency carrier wave of predetermined frequency on the electric power line by means of an oscillator circuit using transistors and then amplifying the voice by means of a voltage amplifier coupled to a modulation means, thus modulating the carrier wave frequency, the output of which is coupled to the power line; and then by means of a selector switch system utilizing the same transistors for receiving, a highly efficient two-way loud speaker power line communicating system is provided.

Referring to the drawing, the single figure shows a schematic wiring diagram of a master station using the system of the present invention.

LS represents a loud-speaker which also serves as a microphone when the system is in transmit condition. The number 10 represents a transistor, which with its connected circuit, serves as an oscillator when the system is in the transmitting condition. When the system is in the receive position, the transistor 10 and another transistor 12 serve, with their associated circuits, as an amplifier having a useful high wattage output. The transistor 10 is in an oscillator circuit with coil 11 and is modulated by the transistor 12 when in the transmitting position. Transistors 14 and 16 drive the modulator transistor 12 when in the transmit position.

A tuned input circuit, designated by the reference numeral 18, includes a pair of coils 20 and 22. The coil 20 is in a rectifying circuit 24 which includes a transistor 26, a detector 28, and condenser 29. The direct current output of the circuit 24 operates a relay 30 and the alternating component of the signal in the circuit 24 is coupled to the amplifier circuit of the transistors 14 and 16 by means of a capacitor 32 which is formed and arranged to pass only the alternating current component of the output signal in the circuit 24. The other coil 22 is in circuit with a carrier current connection, represented by a male electrical connector plug 34, with a switch 36, and with one side of a transformer 38, when in the receive position.

A pair of contacts 40 and 42 are controlled by the relay 30 and are in circuit with the transistors 14 and 16 and connect the source of energizing current to the sound amplifying and reproducing device of the present invention, embodying the circuit of the transistors 10 and 12, coil 11, and the loud-speaker LS. This circuit also includes switches 44, 46, 47 and 49, transformer 48, resistors 50 and 52, capacitors 54 and 56, and an output transformer 58. A dotted line 60 represents the physical connection of the switches 44, 46, 47, and 49, together and to switches 61, 62, and 63, such switch being a seven pole double throw switch, and operable to shift the system between receive and transmit positions.

The oscillator circuit of the transistor 10 includes a tank circuit of resistor 64 and condenser 65. A station selector switch 66 with oscillator capacitors 66' for varying the frequency and a trimmer capacitor 66'' for adjusting the frequency is provided in the oscillator circuit.

The amplifying circuit is provided with a filter circuit consisting in resistors 67 and 68, and condenser 69.

A bridge rectifier 70, with a filter condenser 71, is coupled to the current source transformer 38. The tuned input circuit 18 includes a condenser 72 and shunt resistor 73, with the inductively coupled coils 20 and 22 provided with capacitors 74 and 75. A double pole double throw switch 76 (connected by a dotted line 76') is shown in a position in which other capacitors 77 and 78 are included in the input circuit. In this position, the switch 76 conditions the input circuit for the reception of a "conference call" in which all slave stations are on one predetermined frequency.

A transformer 80 amplifies the alternating current component of the loudspeaker LS with resistor 84 in the transformer circuit. Resistors 87, 88 and 89 bias transistors 14 and 16 to their proper operating current.

In operation, the switches 44, 46, 47, 49, 61, 62 and 63 may be simultaneously biased toward the receive "R" position if desired. Upon receipt of a radio frequency signal from the carrier current transmission line into the input circuit 24 and rectified by the detector, the capacitor 32 will feed the alternating current component of the input signal to the series connected transistors 14 and 16 and thence to the loud-speaker. When the aforesaid switches are shifted to the transmit "T" position, the oscillator transistor 10 and modulator transistor 12 will feed a radio frequency signal modulated by the output of the loud-speaker acting as a microphone to the carrier current transmission line, with the frequency of such signal determined by the selected capacitor 66'.

The transistors 10, 12, 14, 16, and 26, are of conventional design, having emitters, bases, and collectors each connected to the circuit components in the manner well known in the art.

The system of the present invention is believed to be novel in the capacitative coupling of the rectifying circuit to the amplifying and reproducing circuit. The slave stations each have all of the above described components excepting the channel selecting switch 66, associated capacitors 66', switch 76, and capacitors 77 and 78.

While only a single embodiment of the present invention has been hereinabove described, other embodiments are contemplated and numerous changes and modifications may be made in the invention without departing from the spirit of the invention, as set forth in the appended claims.

Having thus set forth and disclosed the nature of this invention, what is claimed is:

1. In a carrier current communication system, a receiver comprising a tuned input circuit, a relay, a sound amplifying and reproducing device, a source of energizing current, a rectifying circuit connected to said input circuit, means connecting the output of said rectifying circuit to said sound amplifying and reproducing device and being formed and arranged to pass only the alternating current component of the output signal of said rectifying circuit, a pair of contacts controlled by said relay, circuit means including said contacts and connecting said source to said sound amplifying and reproducing device, and a transistor connected between the output of the rectifying circuit and the relay and being formed and arranged to energize said relay from the direct current component of said rectifying circuit.

2. In a carrier current communication system, a receiver comprising a tuned input circuit, a relay, a sound amplifying and reproducing device, a source of energizing current, a rectifying circuit connected to said input circuit, means embodying a capacitative coupling connecting the output of said rectifying circuit to said sound amplifying and reproducing device and being formed and arranged to pass only the alternating current component of the output signal of said rectifying circuit, a pair of contacts controlled by said relay, circuit means including said contacts and connecting said source to said sound amplifying and reproducing device, and a transistor connected between the output of the rectifying circuit and the relay and being formed and arranged to energize said relay from the direct current component of said rectifying circuit.

3. In a carrier current communication system, a receiver comprising a tuned input circuit, a relay, a sound amplifying and reproducing device including a pair of driven transistors arranged in a series circuit transformer coupled, a source of energizing current, a rectifying circuit connected to said input circuit, means connecting the output of said rectifying circuit to said sound amplifying and reproducing device and being formed and arranged to pass only the alternating current component of the output signal of said rectifying circuit, a pair of contacts controlled by said relay, circuit means including said contacts and connecting said source to said sound amplifying and reproducing device, and a transistor connected between the output of the rectifying circuit and the relay and being formed and arranged to energize said relay from the direct current component of said rectifying circuit.

4. In a carrier current communication system, a receiver comprising a tuned input circuit, a relay, a sound amplifying and reproducing device including a pair of driven transistors arranged in a series circuit transformer coupled, a source of energizing current, a rectifying circuit connected to said input circuit, means embodying a capacitative coupling connecting the output of said rectifying circuit to said sound amplifying and reproducing device and being formed and arranged to pass only the alternating current component of the output signal of said rectifying circuit, a pair of contacts controlled by said relay, circuit means including said contacts and connecting said source to said sound amplifying and reproducing device, and a transistor connected between the output of the rectifying circuit and the relay and being formed and arranged to energize said relay from the direct current component of said rectifying circuit.

No references cited.